(12) United States Patent
Kistner et al.

(10) Patent No.: US 6,543,809 B1
(45) Date of Patent: Apr. 8, 2003

(54) SIMPLIFIED DATA PACKAGE ASSEMBLY

(75) Inventors: Erin E. Kistner, Portland, OR (US);
Brian Klure, Portland, OR (US)

(73) Assignee: Western Graphics and Data Inc., Portland, OR (US)

( * ) Notice: Subject to any disclaimer, the term of this patent is extended or adjusted under 35 U.S.C. 154(b) by 0 days.

(21) Appl. No.: 10/081,115

(22) Filed: Feb. 21, 2002

(51) Int. Cl.$^7$ ................................................ B42D 15/00
(52) U.S. Cl. ............................ 283/57; 283/61; 283/74; 283/98; 283/101; 283/105; 283/106; 283/901; 283/904; 283/81; 40/306; 40/312; 206/38; 206/39; 206/451; 206/454; 206/459.2; 206/775; 206/782
(58) Field of Search ............................ 283/61, 74, 98, 283/101, 105, 106, 901, 904, 81, 57; 40/306, 312; 206/454, 38, 39, 782, 451, 775, 459.2

(56) References Cited

U.S. PATENT DOCUMENTS

| | | | |
|---|---|---|---|
| 2,616,612 A | | 11/1952 | Guttman |
| 4,345,393 A | | 8/1982 | Price et al. |
| 4,722,376 A | * | 2/1988 | Rhyner ........................ 150/147 |
| 5,413,830 A | * | 5/1995 | Edwards .................... 428/42.1 |
| 5,439,255 A | * | 8/1995 | McIntire et al. .............. 283/62 |
| 5,650,209 A | | 7/1997 | Ramsburg et al. |
| 5,667,247 A | | 9/1997 | Ramsburg et al. |
| D385,488 S | | 10/1997 | Smith et al. |
| 5,720,158 A | | 2/1998 | Goade, Sr. |
| 5,760,381 A | | 6/1998 | Stich et al. |
| 5,777,305 A | | 7/1998 | Smith et al. |
| 5,918,909 A | | 7/1999 | Fiala et al. |
| 5,921,584 A | | 7/1999 | Goade, Sr. |
| 6,109,439 A | * | 8/2000 | Goade, Sr. .................. 206/454 |
| 6,224,108 B1 | | 5/2001 | Klure |
| 6,328,341 B2 | * | 12/2001 | Klure .......................... 206/454 |
| 6,439,613 B2 | * | 8/2002 | Klure .......................... 206/454 |
| 6,454,165 B1 | * | 9/2002 | Dawson ...................... 235/381 |
| 2001/0045738 A1 | * | 11/2001 | Klure .......................... 283/61 |
| 2002/0040935 A1 | * | 4/2002 | Weyant ...................... 235/487 |
| 2002/0100797 A1 | * | 8/2002 | Hollingsworth et al. ... 229/92.8 |

* cited by examiner

*Primary Examiner*—A. L. Wellington
*Assistant Examiner*—Mark T. Henderson
(74) *Attorney, Agent, or Firm*—Chernoff, Vilhauer, McClung & Stenzel, LLP

(57) ABSTRACT

A data package assembly comprises a substrate which includes a panel portion and a data card portion detachable from each other. The data card portion has an exposed face and a concealed face on opposite sides of the substrate, with personal identifying indicia on the concealed face correlated with a prepaid account. The data card portion is folded into an overlapping relationship with the panel portion so that the panel portion faces the concealed face of the data card portion and thereby conceals the personal identifying indicia without requiring folding of the panel portion. The data card portion is detachably retained in overlapping relationship with the panel portion, at least a major portion of the exposed face of the data card portion being visibly exposed.

8 Claims, 3 Drawing Sheets

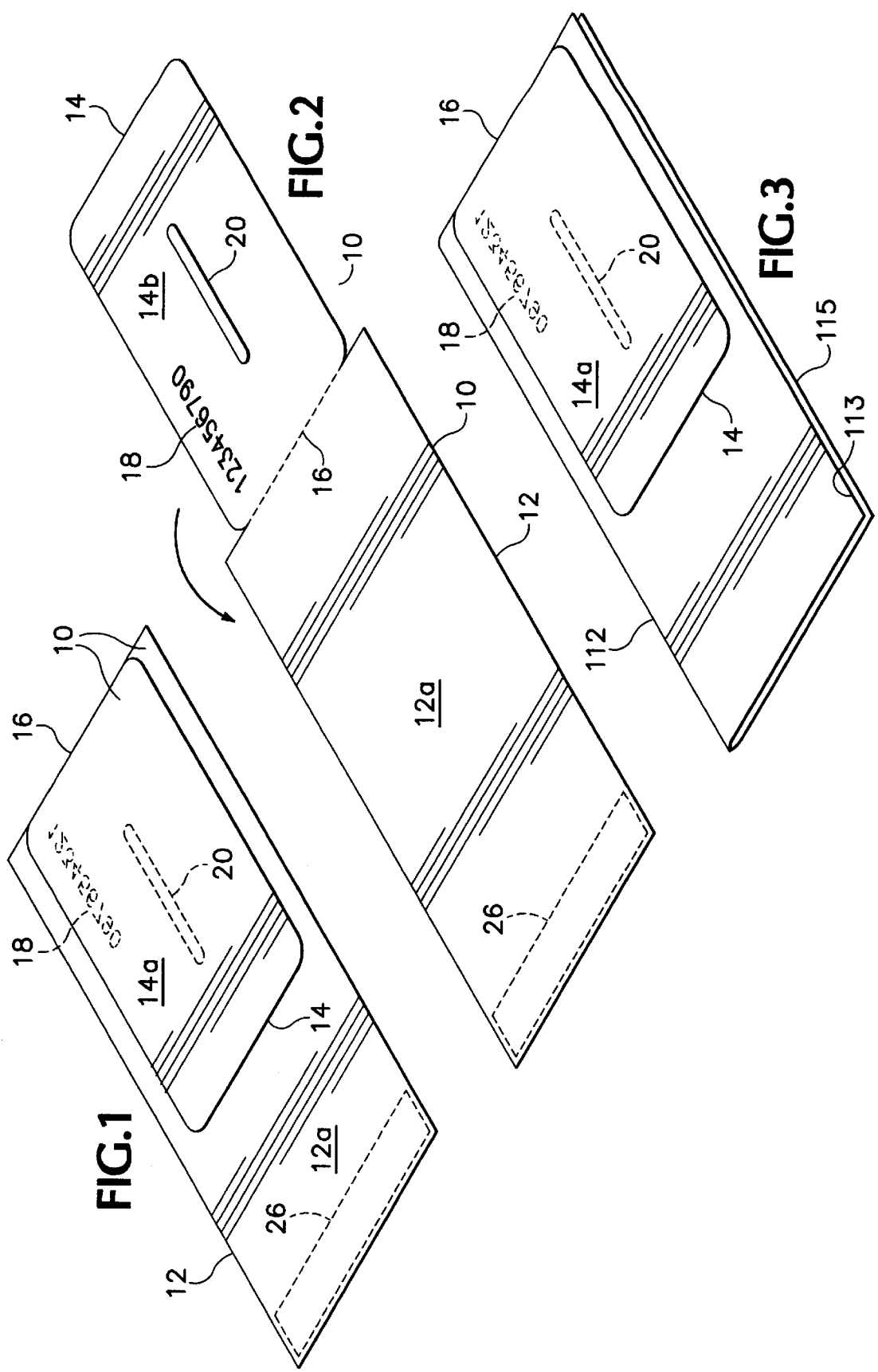

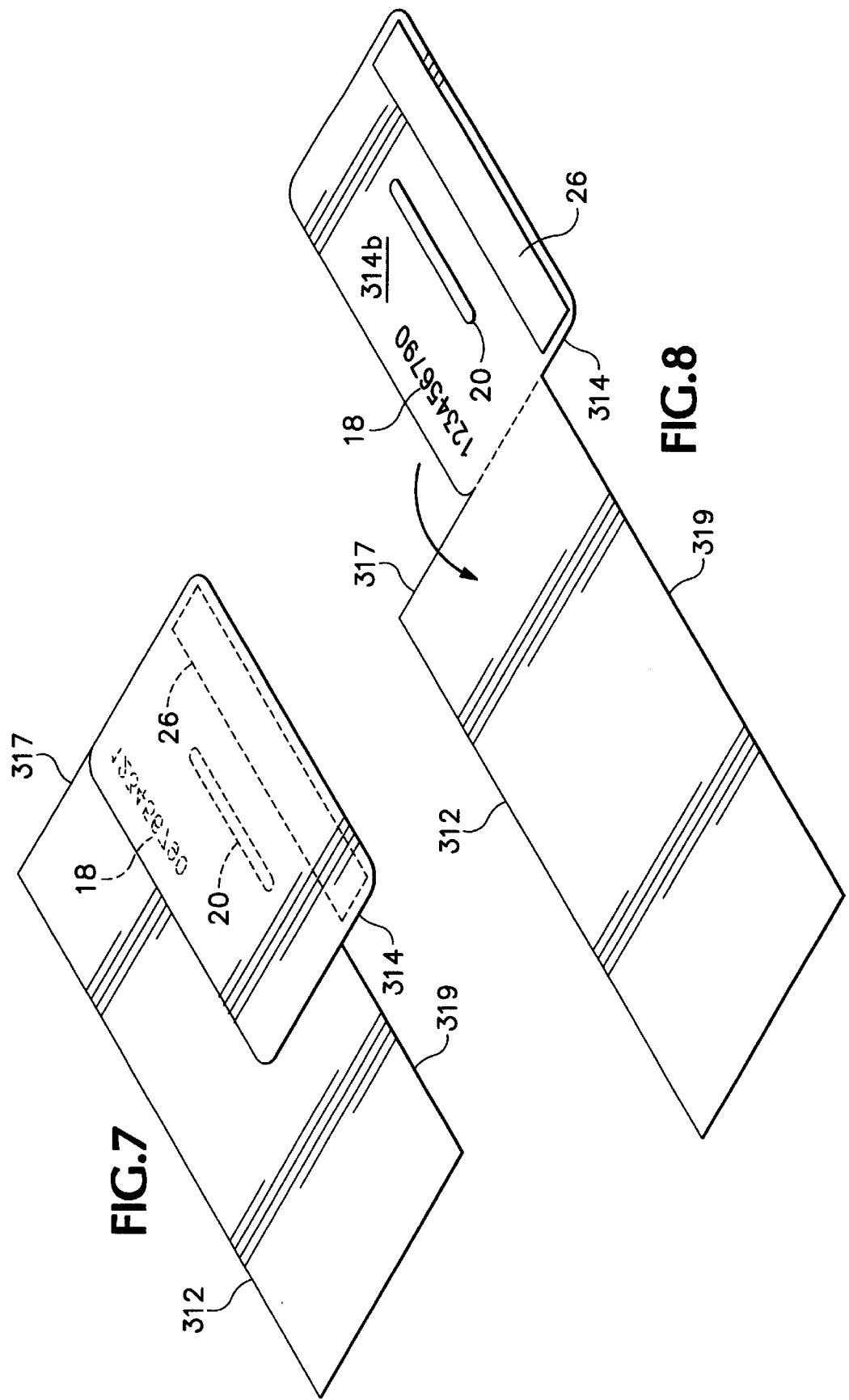

SIMPLIFIED DATA PACKAGE ASSEMBLY

BACKGROUND OF THE INVENTION

The present invention relates to improvements in a data package assembly, especially applicable to various types of prepaid debit cards associated with a prepaid account. The account is debited as the consumer uses the account to purchase services such as telephone services, or purchase goods, withdraw cash, etc.

In the past there have been two different basic types of structures for data package assemblies. A first type is exemplified by U.S. Pat. No. 5,918,909, which is hereby incorporated by reference. In this type of assembly, the data card and the package, respectively, are separately manufactured from different substrates, and thereafter detachably interconnected in such a way that personal identifying indicia (e.g. a PIN number) on the card are concealed by the package. This type of assembly usually displays the data card adequately for the customer's inspection prior to purchase, while providing a high degree of security for personal identifying indicia. Account activation indicia, such as a magnetic strip or bar code, are usually provided in an exposed position on the package or card so that the prepaid account can be activated at the cash register when the data package assembly is purchased. Due to its multicomponent complexity, however, this type of assembly is not particularly economical to produce.

The second basic type of prior data package assembly is similar except that at least the data card and the package are manufactured jointly from a single substrate, with a line of weakness providing easy detachment of the card from the package. This single-substrate type of data package assembly is normally more economical to produce than the first type, but has the disadvantages of failing to display the card adequately for the customer's inspection prior to purchase, and/or reducing the security afforded the personal identifying indicia. Examples of this single-substrate type of data package assembly are shown in U.S. Pat. Nos. 5,650,209 and 5,921,584 which are hereby incorporated by reference.

BRIEF SUMMARY OF THE INVENTION

The present invention overcomes the drawbacks of both of the above-described prior types of data package assemblies by providing a simplified assembly which compatibly combines the foregoing advantages of both types.

In a preferred embodiment, the data package assembly comprises a substrate which includes both a panel portion and a data card portion detachable from each other. The data card portion has an exposed face and a concealed face on opposite sides of the substrate, with personal identifying indicia on the concealed face correlated with a prepaid account. The data card portion is folded into an overlapping relationship with the panel portion so that the panel portion faces the concealed face of the data card portion and thereby conceals the personal identifying indicia without requiring folding of the panel portion. The data card portion is detachably retained in overlapping relationship with the panel portion, at least a major portion of the exposed face of the data card portion being visibly exposed.

The foregoing and other objectives, features, and advantages of the invention will be more readily understood upon consideration of the following detailed description, taken in conjunction with the accompanying drawings.

BRIEF DESCRIPTION OF THE SEVERAL VIEWS OF THE DRAWINGS

FIG. 1 is a front perspective view of an exemplary data package assembly in accordance with the present invention, in its finished, folded configuration.

FIG. 2 is a front perspective view of the assembly of FIG. 1 in its unfolded configuration.

FIG. 3 is a front perspective view of another exemplary embodiment similar to FIG. 1 but having an additional panel, shown in its finished, folded configuration.

FIG. 7 is a front perspective view of a further exemplary embodiment in accordance with the present invention, showing a different finished, folded configuration.

FIG. 8 is a front perspective view of the assembly of FIG. 7 in its unfolded configuration.

DETAILED DESCRIPTION OF THE PREFERRED EMBODIMENTS

In all of the different examples described hereafter, the various indicia imaged on the substrate of the data package assembly, including personal identifying indicia and activation indicia, can include human-readable characters or, alternatively, any machine-readable indicia such as magnetic strip, optical code, etc. Respective indicia correlated with a particular account can be identical indicia or different indicia, as desired. If such account is selectively activatable, the account can be activated upon initial purchase of the corresponding card, and possibly also upon subsequent replenishment of the account if the latter function is considered desirable by the issuer of the card.

Also in all of the examples, the means by which the data card is detachably retained in an overlapping relationship with a panel of a package can be by any well-known means-such as the use of appropriate adhesives, slits, pockets, tabs, enclosures, rivets, stickers, etc. either with or without tamper-revealing structures. Likewise, the methods of making the card and the package, respectively, can be by any well-known means, as exemplified by the prior patents mentioned above.

Subject to the foregoing variations, some examples are described more specifically hereafter.

Figure 5:
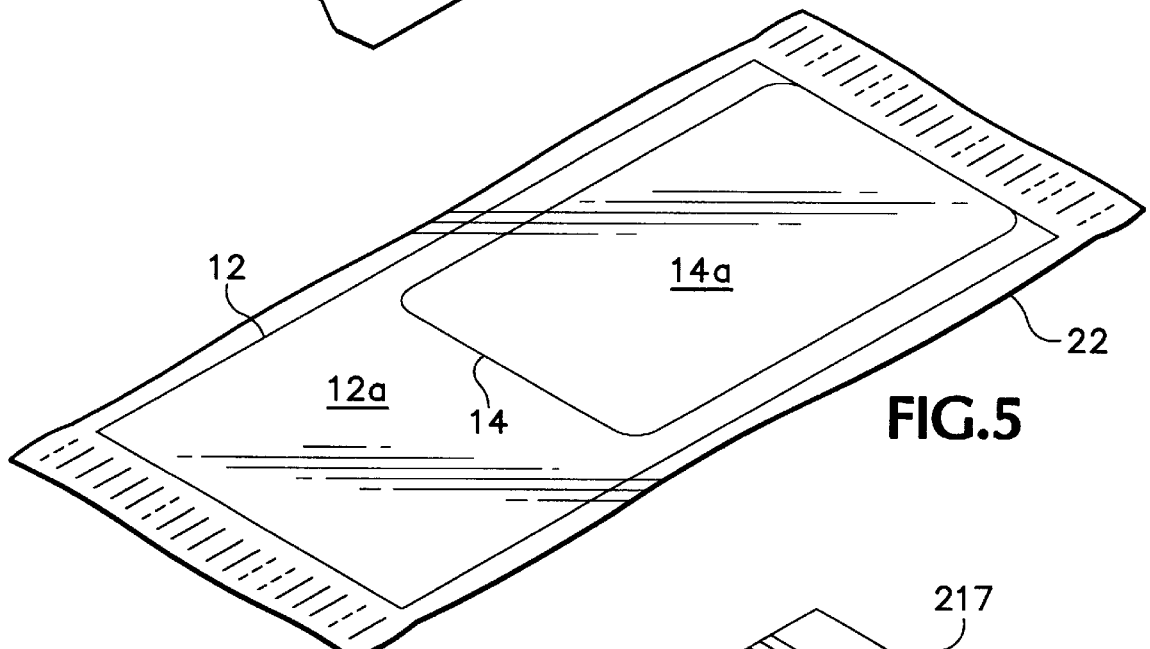
FIG. 5 is a front, folded perspective view of a further exemplary embodiment similar to that of FIGS. 1 and 2, but having a transparent sleeve around the assembly.

In the example of FIGS. 1–2, the data package assembly is composed of a panel portion 12 and a data card portion 14 formed from the same substrate 10 of a relatively stiff paper. Preferably, but not necessarily, the data card portion 14 is smaller than the panel portion 12. Although only a single substrate 10 is shown, one or more other substrates could also be present in the assembly for other purposes. The substrate is preferably coated with one or more resin-based coatings, such as a UV-cured thermosetting resin and/or a varnish, and can be coated identically or differently on its two sides. Also, the data card portion 14 can be coated similarly to the panel portion 12 or, alternatively, differently for purposes of appearance, durability, etc. The data card portion 14 is preferably detachable from the panel portion 12 along a line of weakness 16, such as a perforated line or a die-cut line, and has an exposed face 14a and a concealed face 14b on opposite sides of the substrate 10, the concealed face 14b having personal identifying indicia 18 correlated with a prepaid account. In the finished form of the package assembly shown in FIG. 1, the data card portion 14 is folded into an overlapping relationship with the front face 12a of the panel portion 12 along the line 16, but could alternatively fold along a different fold line. When folded into such overlapping relationship as shown in FIG. 1, the panel portion 12 faces the concealed face 14b of the data card portion 14 and thereby conceals the personal identifying indicia 18, without requiring any folding of the panel portion 12. The data card portion is detachably retained in such overlapping relationship to prevent unfolding thereof by any convenient means, such as a detachable adhesive 20 interconnecting the front face 12a of the panel portion 12 with the concealed face 14b of the data card portion 14. An alternative exemplary detachable retention system which requires no adhesive is shown in FIG. 5, comprising a transparent sleeve 22 enclosing the panel portion and data card portion. In any case, when the data card portion 14 is retained in such overlapping relationship with the panel portion 12, at least a major portion, and preferably all, of the exposed face 14a of the data card portion is visibly exposed for the customer's inspection prior to purchase.

Since the exposed face 14a of the data card portion 14, and the front face 12a of the panel portion 12, are on opposite sides of the substrate but ultimately overlap visually when folded as shown in FIG. 1, the respective coatings on the faces 12a and 14a should preferably match for appearance purposes. Accordingly, if the substrate has different coatings on its two sides, such coatings should be reversed on opposite sides of any fold line such as 16.

Figure 4:
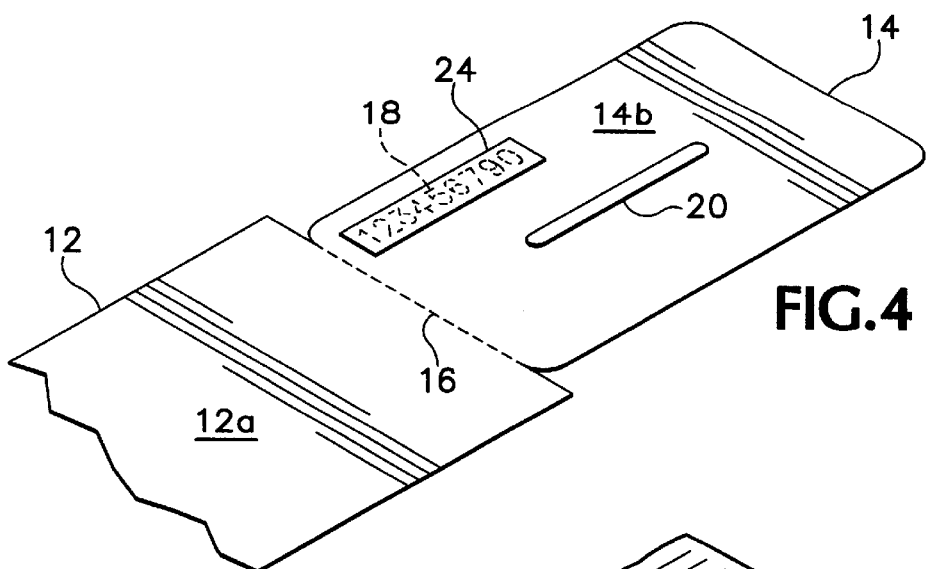
FIG. 4 is a partial, unfolded front perspective view of a further exemplary embodiment similar to that of FIGS. 1 and 2, but having a scratch-off surface further concealing the personal identifying indicia.

For additional security, the personal identifying indicia 18 can be concealed by a scratch-off surface 24 as shown in FIG. 4, in cooperation with the panel portion 12.

FIG. 3 shows an alternative example wherein a panel portion 112 has two parts, 113 and 115, folded into mutually facing relationship to accommodate additional data on the package assembly while still exposing the face 14a of the data card portion.

Preferably the prepaid account is selectively activatable at the cash register, when the data package assembly is purchased, by the entry of activation indicia such as 26 which may be located on a panel such as 12 in FIGS. 1 and 2 or, alternatively, on the data card portion such as 314 as shown in FIGS. 7 and 8. Location of the activation indicia 26 on the data card portion is particularly useful, for example, if it is intended that the owner of the data card be able to replenish the prepaid account at the cash register. In any case, the activation indicia 26 are located in an exposed location for access at the cash register and are correlated with the same prepaid account as the personal identifying indicia 18.

Figure 6:
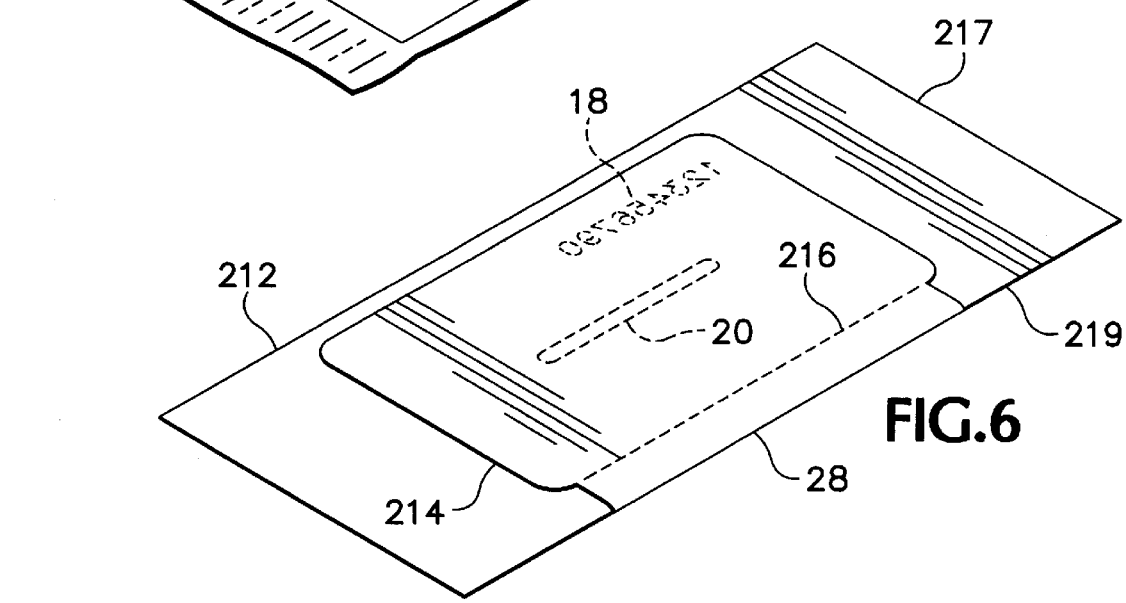
FIG. 6 is a front perspective view of a further exemplary embodiment in accordance with the present invention, showing a different finished, folded configuration.

FIG. 6 depicts an alternative example wherein the data card portion 214 is folded into an overlapping relationship with a panel portion 212 along a fold line 28 which is different from the detachable line of weakness 216. Also, the data card portion 214 is folded along a longitudinal edge 219 of the panel portion 212 rather than an end edge 217 of the panel portion.

In the example of FIGS. 7 and 8, the data card portion 314 is offset laterally from the panel portion 312 so that, when the data card portion 314 is folded along the end edge 317 of the panel portion into overlapping relationship with the panel portion as shown in FIG. 7, a part of the concealed face 314b of the data card portion overhangs the longitudinal edge 319 of the panel portion to expose the activation indicia 26 for accessibility. A similar result would be obtainable if the data card portion 314 were foldable along the longitudinal edge 319 of the panel portion 312 with the data card portion 314 offset longitudinally from the panel portion, so that an end of the data card portion 314 would overhang the end edge 317 of panel portion when the data card portion is folded.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A data package assembly comprising:
    (a) a substrate which includes a panel portion and a data card portion, said panel portion and data card portion being detachable from each other;
    (b) said data card portion having an exposed face and a concealed face on opposite sides of said substrate, and personal identifying indicia on said concealed face correlated with a prepaid account;
    (c) said data card portion being folded into an overlapping relationship with said panel portion so that said panel portion faces said concealed face of said data card portion and thereby conceals said personal identifying indicia without requiring folding of said panel portion;
    (d) said data card portion being detachably retained in said overlapping relationship with said panel portion by an adhesive interconnecting said panel portion with said concealed face of said data card portion so as to prevent said data card portion from unfolding from said overlapping relationship, at least a major portion of said exposed face of said data card portion being visibly exposed.

2. The data package assembly of claim 1 wherein said personal identifying indicia are further concealed by a scratch-off surface on said concealed face of said data card portion covering said personal identifying indicia.

3. The data package assembly of claim 1 wherein said prepaid account is selectively activatable, further including activation indicia correlated with said account in an exposed location on said panel portion.

4. The data package assembly of claim 1 wherein said prepaid account is selectively activatable, further including activation indicia correlated with said account in an exposed location on said data card portion.

5. The data package assembly of claim 1 wherein said panel portion has two parts folded into mutually facing relationship.

6. The data package assembly of claim 1 wherein said panel portion and said data card portion are detachable from each other along a line of weakness in said substrate.

7. The data package assembly of claim 1 wherein said data card portion is smaller than said panel portion.

8. The data package assembly of claim 6 wherein said data card portion is folded into said overlapping relationship along said line of weakness.

* * * * *